United States Patent [19]

Sugimoto et al.

[11] Patent Number: 5,142,017
[45] Date of Patent: Aug. 25, 1992

[54] AROMATIC POLYESTER AND A PROCESS FOR PRODUCING THE SAME

[75] Inventors: Hiroaki Sugimoto; Yoshitaka Ohbe, both of Tsukuba; Kazuo Hayatsu, Ibaraki, all of Japan

[73] Assignee: Sumitomo Chemical Company, Limited, Osaka, Japan

[21] Appl. No.: 554,428

[22] Filed: Jul. 19, 1990

[30] Foreign Application Priority Data

Jul. 25, 1989 [JP] Japan ................................. 1-193111

[51] Int. Cl.⁵ ..................... C08G 63/02; C08G 63/18
[52] U.S. Cl. ................................ 528/193; 528/176; 528/194
[58] Field of Search ................ 528/176, 193, 194

[56] References Cited

U.S. PATENT DOCUMENTS 3,637,595  1/1972  Cottis et al. .
3,778,410  12/1973  Kuhfuss et al. .

FOREIGN PATENT DOCUMENTS 47-47870  12/1972  Japan .
56-18016  4/1981  Japan .
61-296028 12/1986  Japan .
63-317524 12/1988  Japan .

OTHER PUBLICATIONS

Macromolecules, vol. 20, No. 11, Nov. 1987, Washington, DC, USA pp. 2660-2664; K. Clausen, et al.: "Thermotropic Liquid Crystal Aromatic/Cycloaliphatic Polyesters with Flexible Spacers".
Polymer Journal, vol. 14, No. 1, 1982, Tokyo, Japan, pp. 9-17; C. Ober, et al.: "Liquid Crystal Polymers, V. Thermotropic Polyesters with Either Dyad or Triad Aromatic Ester Mesogenic Units and Flexible Polymethylene Spacers in the Main Chain".
Macromolecules, vol. 20, No. 10, Oct. 1987, Columbus, Ohio, USA, pp. 2340-2344; J. C. W. Chien, et al.: "Liquid Crystalline Compounds and Polymers from Promesogens".
Jedlinski et al., Macromolecules, 22, pp. 1600-1603 (1989).
J. Polym. Sci.: Polym. Chem. Ed., 14, 2043 (1976).

*Primary Examiner*—John Kight, III
*Assistant Examiner*—T. Mosley
*Attorney, Agent, or Firm*—Stevens, Davis, Miller & Mosher

[57] ABSTRACT

An aromatic polyester comprising the repeating units (A), (B), (C) and (D) represented by the following formulae in amounts of 0 to 80 mole %, 10 to 50 mole %, 5 to 50 mole % and 0 to 30 mole %, respectively, having a logarithmic viscosity of 1.0 dl/g or more and capable of being melt-molded at a temperature of 350° C. or less:

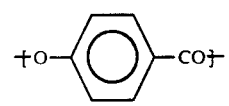

(A)

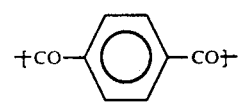

(B)

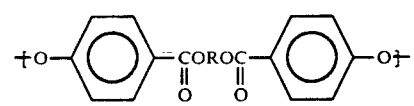

(C)

where R represents a $C_2$-$C_6$ alkylene, and

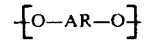 (D)

where Ar represents a divalent aromatic residue, and a process for producing the same. The aromatic polyesters according to the present invention combine moldability and heat resistance in a good state and have mechanical properties of sufficient practical value. An aromatic polyester according to the present invention shows optical anisotropy at a molten state.

6 Claims, No Drawings

AROMATIC POLYESTER AND A PROCESS FOR PRODUCING THE SAME

BACKGROUND OF THE INVENTION

1. Field of the Invention

The present invention relates to an aromatic polyester having an excellent heat resistance and a good melt-moldability and a process for producing the same.

2. Description of the Prior Art

Various trials to obtain a heat-resistant polyester have long been made. For example, polyethylene terephthalate obtained by polycondensation of a dicarboxylic acid with a diol (hereinafter referred to as PET) is known to be a general-purpose polyester having a melting point of 260° C. and an excellent moldability. Also, like an aromatic polyester having a repeating unit of

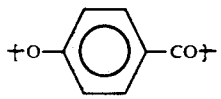

obtained by polycondensation of p-hydroxybenzoic acid which is one of oxy acids (for example, Ekonol ® E-101 produced by Sumitomo Chemical Co., Ltd.), there are known special polyesters which are highly crystalline and have extremely high thermal stability enough not to decompose even at 300° C. at all. Further, as examples of polyesters obtained by polycondensation of a dicarboxylic acid, a diol and an oxy acid, for example polyesters obtained by polycondensation of terephthalic acid, hydroquinone and p-hydroxybenzoic acid are disclosed in Japanese Patent Application Kokoku No. 47-47870. Still further, liquid-crystal polyesters are reported as a polyester which has a good melt-moldability and is suitable for uses requiring high strength and high modulus of elasticity (Japanese Patent Application Kokoku No. 56-18016 and Journal of Polymer Science : Polymer Chemistry Edition, Vol. 14, pp. 2043, 1976).

It is said that moldability and heat resistance are in an opposite relation, and polyesters combining these two properties in a good state have not yet been known. For example, the foregoing PET and liquid-crystal high polymers comprising PET and p-acetoxybenzoic acid are superior in the moldability, but cannot be used in uses requiring resistance to a temperature of 200° C. or more. Aromatic polyesters like the foregoing Ekonol ® E-101 are superior in the heat resistance, but its melting point exceeds 500° C. so that melt-molding is very difficult. Further, the polyesters disclosed in the foregoing Japanese Patent Application Kokoku No. 47-47870, because of their molding temperature being 360° C. or more, are not said to have a sufficient moldability.

SUMMARY OF THE INVENTION

The present inventors have extensively studied to solve these problems, and as a result, have found that an aromatic polyester combining excellent moldability and thermal resistance, and yet having good mechanical properties is obtained by polycondensation of particular monomer components in a particular proportion. The present inventors thus completed the present invention.

That is, the present invention relates to an aromatic polyester comprising the repeating units (A), (B), (C) and (D) represented by the following formulae in amounts of 0 to 80 mole %, 10 to 50 mole %, 5 to 50 mole % and 0 to 30 mole %, respectively, having a logarithmic viscosity of 1.0 dl/g or more and capable of being melt-molded at a temperature of 350° C. or less:

 (A)

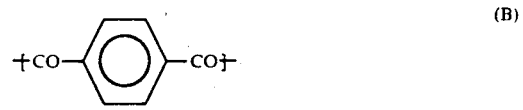 (B)

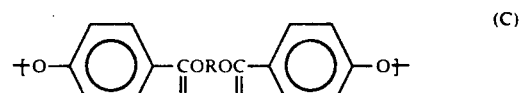 (C)

where R represents a $C_2$—$C_6$ alkylene,

 (D)

where Ar represents a divalent aromatic residue, and a process for producing the above aromatic polyester comprising polycondensing 0 to 80 parts by mole of a compound represented by the formula (A') or its ester-forming derivative (hereinafter referred to as Component A'), 10 to 50 parts by mole of a compound represented by the formula (B') or its ester-forming derivative (hereinafter referred to as Component B'), 5 to 50 parts by mole of a compound represented by the formula (C') or its ester-forming derivative (hereinafter referred to as Component C') and 0 to 30 parts by mole of a compound represented by the formula (D') or its ester-forming derivative (hereinafter referred to as Component D'), the total amount of Components A', B', C' and D' being 100 parts by mole, at a reaction temperature in a range of 250° C. to 380° C.:

 (A')

 (B')

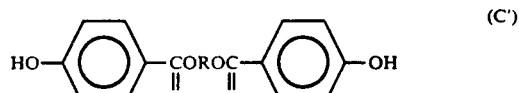 (C')

where R represents a $C_2$—$C_6$ alkylene, and

 (D')

where Ar represents a divalent aromatic residue.

An object of the present invention is to provide an aromatic polyester combining moldability (particularly melt-moldability) and heat resistance in a good state, and yet having mechanical properties of sufficient practical value.

Other objects and advantages of the present invention will become apparent from the following description.

PREFERRED EMBODIMENTS OF THE INVENTION

As the $C_2$-$C_6$ alkylene represented by R in the formulae (C) and (C'), $-CH_2CH_2-$, $-CH(CH_3)CH_2-$, $-CH_2CH_2CH_2-$, $-H_2C(CH_2)_2CH_2-$, $-CH_2(CH_2)_4CH_2-$ and 1,4-cyclohexylene are preferred in terms of the physical properties of the aromatic polyester obtained.

As the divalent aromatic residue represented by Ar in the formulae (D) and (D'),

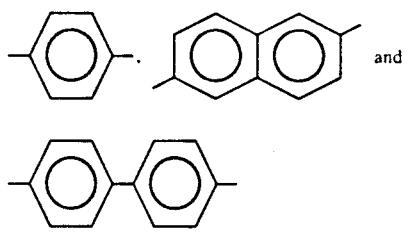

are preferred in terms of the physical properties of the aromatic polyester obtained.

The aromatic polyester comprising the repeating units (A), (B), (C) and (D) in proportions of 0 to 80 mole %, 10 to 50 mole %, 5 to 50 mole % and 0 to 30 mole %, respectively, is crystalline and excellent in melt-moldability, mechanical properties, chemical resistance and thermal resistance. Preferred proportions of these repeating units are 20 to 70 mole % for (A), 10 to 40 mole % for (B), 5 to 30 mole % for (C) and 0 to 20 mole % for (D). When the proportion of the repeating unit (A) exceeds 80 mole %, the melt-processing property becomes very poor, and when it is less than 20 mole %, the mechanical properties and heat distortion temperature lower. When the repeating unit (B) is not a terephthalic acid residue, the crystallization property of the aromatic polyester is not said to be satisfactory in many cases. When the proportion of the repeating unit (C) exceeds 50 mole %, the aromatic polyester obtained undesirably becomes poor in thermal stability and also lowers in crystallinity, and when it is less than 5 mole %, the melt-processing property lowers. Further, by introducing the repeating unit (D) of 0 to 30 mole % based on the total weight of the polyester, the resultant aromatic polyester comes to have well-balanced physical properties.

Component A' includes p-hydroxybenzoic acid, p-formoxybenzoic acid, p-acetoxybenzoic acid, p-propyloxybenzoic acid, methyl p-hydroxybenzoate, phenyl p-hydroxybenzoate, benzyl p-hydroxybenzoate, methyl p-acetoxybenzoate and, although not shown in the above structural formulae, derivatives of these compounds substituted with alkyl, aryl, alkoxy or halogen at their aromatic nuclei.

Component B' includes terephthalic acid, dimethyl terephthalate, diphenyl terephthalate, terephthalic acid dichloride, etc.

Component C' includes 1,2-bis(4-hydroxybenzoyloxy)ethane (hereinafter referred to as BHBE), 1,2-bis(4-hydroxybenzoyloxy)propane (hereinafter referred to as 1,2-BHBP), 1,3-bis(4-hydroxybenzoyloxy)propane, 1,4-bis(4-hydroxybenzoyloxy)butane, 1,6-bis(4-hydroxybenzoyloxy)hexane, 1,4-bis(4-hydroxybenzoyloxy)cyclohexane and their ester-forming derivatives.

Component D' includes hydroquinone, 4,4'-dihydroxydiphenyl, 4,4'-dihydroxydiphenylmethane, 4,4'-dihydroxydiphenylethane, 4,4'-dihydroxydiphenyl ether, 4,4'-dihydroxybenzophenone, 4,4'-diacetoxybenzophenone, 4,4'-dihydroxydiphenyl sulfone, 4,4'-dihydroxydiphenyl sulfide, 2,2-bis(4-hydroxyphenyl)propane, 2,6-dihydroxynaphthalene, 1,4-dihydroxynaphthalene, 1,5-dihydroxynaphthalene, 1,4-diacetoxybenzene, 4,4'-diacetoxydiphenyl, 4,4'-dipropyloxydiphenyl ether, 2,6-diformoxynaphthalene and derivatives of these compounds substituted with alkyl, aryl, alkoxy or halogen at their aromatic nuclei.

The aromatic polyester of the present invention is obtained by polycondensing Components A', B', C' and D' in amounts of 0 to 80 parts by mole, 10 to 50 parts by mole, 5 to 50 parts by mole and 0 to 30 parts by mole, respectively, in a polymerization vessel. These components may be fed to the polymerization vessel in either one lot or divided lots. The process of this reaction may be any of batch process, continuous process and combination thereof.

As Component C', there may be used a compound obtained by carrying out a pre-stage reaction using a diol and p-hydroxybenzoic acid as materials, isolated from the reaction system and purified. Alternatively, the compound as contained in said reaction system having a purity of 85% or more may be used as it is without being isolated.

According to a process of the present invention, it is possible to introduce an aliphatic diol component e.g. ethylene glycol optionally and in good efficiency into the polymer, thereby obtaining a homogeneous liquid-crystal aromatic polyester.

Reaction temperature for the polycondensation is preferably 250° C. to 380° C., more preferably 270° C. to 330° C. When the reaction temperature is lower than 250° C., this reaction is difficult to occur. When the reaction temperature exceeds 380° C., side reactions such as decomposition, etc. sometimes occur. Different reaction temperatures within the above temperature range may be used when the reaction is carried out in plural stages. In some cases, the temperature of the polycondensation system may be raised to the required one and then immediately lowered.

When the reaction temperature is in the above range, reaction time for the polycondensation is preferably 0.5 to 10 hours. This polycondensation may be carried out under normal pressure, reduced pressure or a combination of normal and reduced pressures at multiple stages.

The polycondensation preferably proceeds without a solvent. If necessary, however, a solvent such as hydrocarbons of high boiling point, ethers, silicone oils, fluorine-containing oils e.g. DEMNUM S-200 made by Daikin Co. Ltd., etc. may be used.

The polycondensation preferably proceeds without a catalyst. If necessary, however, compounds containing cobalt, manganese, tin, titanium, antimony, germanium or phosphorus, amine compounds, etc. may be used alone or in mixture as a polymerization catalyst. Particularly, cobalt acetate, manganese acetate, dibutyltin oxide and di-n-butyltin diacetate are preferred. The polycondensation may be carried out using a stabilizer and a filler together with Components A', B', C' and D'.

The aromatic polyester of the present invention has a logarithmic viscosity, $\eta$ inh. of 1.0 dl/g or more, preferably 1.5 dl/g or more from the standpoint of mechanical properties, said logarithmic viscosity being defined by the following equation as a measure of molecular weight:

$$\eta \text{ inh} = (\ln \eta \text{ rel})/C$$

wherein $\eta$ rel is a relative viscosity represented by the ratio of times required for a polymer solution and a solvent to flow down between two determined index marks on a capillary tube, and C is a concentration of the polymer solution (unit, g/dl). In the present invention, 2,3,5,6-tetrafluorophenol is used as a solvent for viscosity measurement, and the viscosity is measured at a polymer concentration of 1 g/dl and a temperature of 60° C. Aromatic polyesters having a $\eta$ inh less than 1.0 have a low molecular weight and inferior heat resistance, so that they have a problem of moldability and molded products made of them have insufficient physical properties.

The aromatic polyesters of the present invention are crystalline and stable to melt-mold and use at high temperatures. Further, the aromatic polyesters show optical anisotropy at a molten state, so that they are excellent in processing properties and also mechanical properties. The aromatic polyesters can be used being molded into fibers, films and other various forms. Still further, compositions comprising the aromatic polyester and inorganic materials such as glass fiber, mica, talc, silica, potassium titanate, wollastonite, calcium carbonate, quartz, iron oxide, graphite, carbon fiber, etc. are excellent in mechanical properties, electrical properties, chemical resistance and oil resistance, so that they can be used as machine parts, electric and electronic parts, automobile parts, etc.

The present invention is illustrated below in more detail with reference to the following examples, but these examples are not to be construed to limit the scope of the present invention. Methods for measuring the physical properties described in the examples are as follows:

Optical Anisotropy

The optical anisotropy of the sample resin in a molten state was measured by heating the powdery sample resin of 250 μm or less in particle size placed on a heating stage (Microscope heat stage 1350 type, Leitz) at a heating rate of 25° C./min and macroscopically observing the state of the melt under a polarized light by means of OPTIPHOT-POL XTP-11 (Nikon Corp.).

Weight Reduction

About 20 mg of the sample resin of 250 μm or less in particle size was heated in the air at a heating rate of 10° C./min by means of a thermobalance TG-DTA Standard-type (produced by Rigaku Corp.), and a reduction in weight at 400° C. was measured.

Flow Temperature

This temperature is an index of melt-flowability. It was measured by means of a capillary rheometer (Flow Tester CFT-500 produced by Shimadzu Corp.), and expressed by a temperature at which the sample resin shows a melt viscosity of 48,000 poises when it is melted by heating at a heating rate of 4° C./min and extruded from a nozzle of 1 mm in internal diameter and 10 mm in length under a load of 100 kg/cm².

Tension Test

This test was carried out according to ASTM D-638 under the following conditions: Test piece, a dumbbell-shaped test piece of a molded product; number of samples, 6; distance between gauze marks, 40 mm; and tensile rate, 5 mm/min.

Heat Distortion Temperature

Measured under a pressure of 18.6 kg/cm² according to ASTM D-648.

EXAMPLE 1

An example wherein the molar ratio of the repeating units (A), (B), (C) and (D) is 40:30:10:20 is shown below. To a polymerization vessel equipped with a condenser and a comb-form agitating element and having a small clearance between the wall of the vessel and the agitating element, were fed 580 g (4.2 moles) of p-hydroxybenzoic acid, 323.3 g (1 mole) of BHBE, 514.6 g (3.1 moles) of terephthalic acid and 390.6 g (2.1 moles) of 4,4'-dihydroxydiphenyl. Thereafter, 1274.2 g (12.48 moles) of acetic acid anhydride was added, and reaction was carried out at 140° C. for 2 hours with stirring under a nitrogen gas stream. The temperature of the contents was raised to 320° C. at a heating rate of 2° C./min while distilling acetic acid, a by-product, out of the vessel. The reaction was further continued at 320° C. for 2.5 hours, and then a valve at the bottom of the polymerization vessel was opened to recover the reaction product in a molten state. Thus, 1,600 g of a pale yellowish brown prepolymer was obtained (percent recovery, 99%).

This prepolymer was pulverized on a crusher to particles of 0.5 mm or less in average particle size and treated at 230° C. for 2 hours in a furnace under a nitrogen gas atmosphere. Thereafter, the temperature was raised to 280° C., and solid phase polymerization was carried out at the same temperature for 2 hours to obtain 1,503 g (95.0% of the theoretical yield) of the objective polymer in a powdery form.

This powdery polymer was insoluble in any of xylene, tetrahydrofuran, chloroform, m-cresol and a phenol/tetrachloroethane (6:4 by volume) mixture. This polymer had a logarithmic viscosity ($\eta$ inh) of 1.67 dl/g and a flow temperature of 317° C. Further, this polymer showed optical anisotropy at a molten state higher than 340° C., and was found to be crystalline by wide-angle X-ray diffraction analysis. This polymer showed that there was no weight reduction until 300° C., and that the percent weight reduction was 0.4% until 400° C.

A mixture of 600 g of this polymer and 400 g of a glass fiber of 13 μm in diameter and 75 μm in average length could be well pelletized at 340° C. to obtain pellets. These pellets could be well injection-molded on an injection molding machine PS 40E 5ASE (produced by Nissei Plastic Industrial, Co., Ltd.) at a cylinder temperature of 350° C. to obtain test pieces. The test pieces obtained had the following properties: Tensile strength, 1,340 kg/cm²; modulus of elasticity, $8.0 \times 10^4$ kg/cm²; and heat distortion temperature, 257° C.

EXAMPLE 2

An example wherein the molar ratio of the repeating units (A), (B), (C) and (D) is 40:30:15:15 is shown below. Polymerization and after-treatment were carried out in the same manner as in Example 1 except that 580 g (4.2 moles) of p-hydroxybenzoic acid, 514.6 g (3.1 moles) of terephthalic acid, 468.6 g (1.55 moles) of BHBE, 288.3 g (1.55 moles) of 4,4'-dihydroxydiphenyl and 1,274.2 g (12.48 moles) of acetic acid anhydride were used, to obtain a pale yellowish brown powdery polymer. The yield of the polyester was 1,598 g (96.0% of the theoretical yield).

This powdery polymer also was insoluble in any of xylene, tetrahydrofuran, chloroform, m-cresol and a phenol/tetrachloroethane (6:4 by volume) mixture. This polymer had a logarithmic viscosity (η inh) of 1.51 dl/g and a flow temperature of 307° C. Further, this polymer showed optical anisotropy at a molten state higher than 330° C., and was found to be crystalline by wide-angle X-ray diffraction analysis. The percent weight reduction of this polymer was 1.0% until 400° C.

A mixture of 600 g of this polymer and 400 g of a glass fiber of 13 μm in diameter and 75 μm in average length could be well pelletized at 325° C. to obtain pellets. These pellets also could be well injection-molded at a cylinder temperature of 310° C. The test pieces obtained had the following physical
properties: Tensile strength, 1,330 kg/cm² and heat distortion temperature, 221° C.

EXAMPLE 3

414.3 Grams (3 moles) of p-hydroxybenzoic acid, 117.67 g (1.5 moles, corrected with a purity as 97%) of propylene glycol and a catalytic amount of p-toluenesulfonic acid were fed to the same reaction vessel as used in Example 1. Reaction was then carried out at 180° C. for 1.5 hours while distilling H₂O, a by-product, out of the reaction vessel to obtain crude 1,2-BHBP. The purity of this crude BHBP was found to be 90% by high-performance liquid chromatography, so that the reaction product was cooled as it was without being purified. Thereafter, to the cooled reaction product were added 828.6 g (6 moles) of p-hydroxybenzoic acid, 498 g (3 moles) of terephthalic acid, 279 g (1.5 moles) of 4,4'-dihydroxydiphenyl and 1,470.2 g (14.4 moles) of acetic acid anhydride, and acetylation was carried out at 140° C. for 3 hours. The temperature of the reaction solution was then raised to 280° C. at a heating rate of 2° C./min while distilling acetic acid, a by-product, out of the reaction vessel. Condensation reaction was then carried out while raising the temperature from 280° C. to 320° C. at a heating rate of 1° C./min and maintaining the temperature at 320° C. for 2 hours. A valve at the bottom of the polymerization vessel was opened to recover the reaction product in a molten state. Thus, 1,775.4 g (percent recovery, 95.5%) of a pale yellowish brown prepolymer was obtained.

This prepolymer was pulverized on a crusher to particles of 0.5 mm or less in average particle size and subjected to solid phase polymerization at 210° C. for 3 hours and then at 280° C. for 4 hours in a furnace under a nitrogen gas atmosphere. Thus, 1,740 g (93.6% of the theoretical yield) of the objective polymer was obtained in a powdery form. This polymer had a flow temperature of 306° C. and showed optical anisotropy at a molten state higher than 340° C.

A mixture of 600 g of this polymer and 400 g of a glass fiber of 13 μm in diameter and 75 μm in average length could be well pelletized at 315° C., and the resulting pellets could be well injection-molded at a cylinder temperature of 345° C. The test pieces obtained had the following physical properties: Tensile strength, 1,160 kg/cm²; modulus of elasticity, 7.5×10⁴ kg/cm²; and heat distortion temperature, 230° C.

COMPARATIVE EXAMPLE 1

Polymerization and after-treatment were carried out in the same manner as in Example 1 except that 856.2 g (6.2 moles) of p-hydroxybenzoic acid, 514.6 g (3.1 moles) of terephthalic acid, 390.6 g (2.1 moles) of 4,4'-dihydroxydiphenyl and 62.0 g (1 mole) of ethylene glycol were fed at the same time, and then 1,518 g (14.88 moles) of acetic acid anhydride was fed. A massive polymer was recovered after the polymerization, and a pale yellowish brown powdery polymer was obtained by the after-treatment. The yield of the polyester was 1,598 g (96.0% of the theoretical yield). On examining the distilate, it was found that ethylene glycol was little introduced into the polymer, and about 80% of ethylene glycol was recovered as ethylene glycol diacetate.

This powdery polymer also was insoluble in any of xylene, tetrahydrofuran, chloroform, m-cresol and a phenol/tetrachloroethane (6:4 by volume) mixture. This polymer showed optical anisotropy at a molten state higher than 370° C., and was found to be crystalline by wide-angle X-ray diffraction analysis. The percent weight reduction of this polymer was 0.5% or less until 300° C.

A mixture of 600 g of this polymer and 400 g of a glass fiber of 13 μm in diameter and 75 μm in average length could not be pelletized at a temperature of 350° C. or less.

What is claimed is:

1. An aromatic polyester comprising the repeating units (A), (B), (C) and (D), represented by the following formulae, the repeating units (A), (B) and (C) in amounts of 0 to 80 mole %, 10 to 50 mole % and 5 to 50 mole %, respectively, the repeating unit (D) being present in an amount greater than 0 mole % and up to 30 mole %, having a logarithmic viscosity of 1.0 dl/g or more and capable of being melt-molded at a temperature of 350° C. or less:

(A)

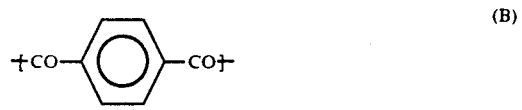

(B)

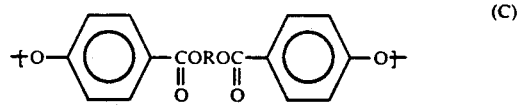

(C)

where R represents a C₂–C₆ alkylene, and

(D)

where Ar represents a divalent aromatic residue.

2. An aromatic polyester according to claim 1, wherein R is one member selected from the group consisting of —CH₂CH₂—, —CH(CH₃)CH₂—, —CH₂CH₂CH₂—, —CH₂(CH₂)₂CH₂—, —CH₂(CH₂)₄CH₂— and 1,4-cyclohexylene, and Ar is one member selected from the group consisting

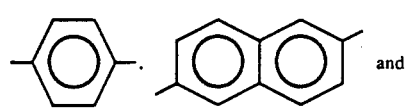

and

-continued

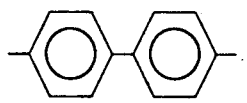

3. A process for producing an aromatic polyester as in claim 1 comprising polycondensing 0 to 80 parts by mole of a compound represented by the formula (A') or its ester-forming derivative (hereinafter referred to as Component A'), 10 to 50 parts by mole of a compound represented by the formula (B') or its ester-forming derivative (hereinafter referred to as Component B'), 5 to 50 parts by mole of a compound represented by the formula (C') or its ester-forming derivative (hereinafter referred to as Component C') and 0 to 30 parts by mole of a compound represented by the formula (D') or its ester-forming derivative (hereinafter referred to as Component D'), the total amount of Components A', B', C' and D' being 100 parts by mole, at a reaction temperature in a range of 250° C. to 380° C.:

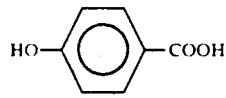 (A')

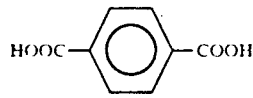 (B')

-continued

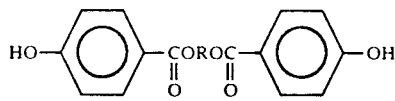 (C')

where R represents a $C_2$-$C_6$ alkylene, and

HO—Ar—OH (D')

where Ar represents a divalent aromatic residue.

4. A process according to claim 3, wherein R is one member selected from the group consisting of —$CH_2CH_2$—, —$CH(CH_3)CH_2$—, —$CH_2CH_2CH_2$—, —$CH_2(CH_2)_2CH_2$—, —$CH_2(CH_2)_4CH_2$— and 1,4-cyclohexylene, and Ar is one member selected from the group consisting of

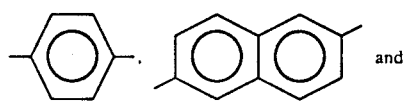 and

5. A process according to claim 4, wherein Component A' is one member selected from the group consisting of p-hydroxybenzoic acid, p-formoxybenzoic acid, p-acetoxybenzoic acid, p-propyloxybenzoic acid, methyl p-hydroxybenzoate, phenyl p-hydroxybenzoate, benzyl p-hydroxybenzoate, methyl p-acetoxybenzoate and derivatives of these compounds substituted with alkyl, aryl, alkoxy or halogen at their aromatic nuclei, and Component B' is one member selected from the group consisting of terephthalic acid, dimethyl terephthalate, diphenyl terephthalate and terephthalic acid dichloride.

6. An aromatic polyester according to claim 1 showing optical anisotropy at a molten state.

* * * * *